US012526154B2

(12) United States Patent
Su et al.

(10) Patent No.: US 12,526,154 B2
(45) Date of Patent: Jan. 13, 2026

(54) ONLINE SIGNING SYSTEM AND METHOD, COMPUTING APPARATUS, AND COMPUTER-READABLE RECORDING MEDIUM

(71) Applicant: KDAN MOBILE SOFTWARE LTD., Tainan (TW)

(72) Inventors: Po-Chou Su, Tainan (TW); Hsuan Tu, Tainan (TW); Nan-Kuang Lee, Tainan (TW); Jia-Rou Lee, Tainan (TW); Weichih Sun, Tainan (TW); Kai-Yi Wu, Tainan (TW); Ying-Hsiu Chen, Tainan (TW)

( * ) Notice: Subject to any disclaimer, the term of this patent is extended or adjusted under 35 U.S.C. 154(b) by 398 days.

(21) Appl. No.: 17/975,507

(22) Filed: Oct. 27, 2022

(65) Prior Publication Data

US 2023/0138504 A1    May 4, 2023

Related U.S. Application Data

(60) Provisional application No. 63/272,694, filed on Oct. 28, 2021.

(30) Foreign Application Priority Data

Sep. 23, 2022    (TW) .................................. 111136214

(51) Int. Cl.
    *H04L 9/32*        (2006.01)
    *G06F 21/62*       (2013.01)
(52) U.S. Cl.
    CPC ........ *H04L 9/3247* (2013.01); *G06F 21/6218* (2013.01); *H04L 9/3268* (2013.01)
(58) Field of Classification Search
    CPC .. H04L 9/3249; H04L 9/3268; G06F 21/6218
    See application file for complete search history.

(56) References Cited

U.S. PATENT DOCUMENTS 9,698,992 B2 *  7/2017  Gertner ................. H04L 63/123
9,866,393 B1 *  1/2018  Rush ..................... H04L 9/3236
(Continued)

FOREIGN PATENT DOCUMENTS

CN      111898983       11/2020
CN      111898983 A     11/2020
(Continued)

OTHER PUBLICATIONS

"Office Action of Taiwan Counterpart Application", issued on Mar. 24, 2023, p. 1-p. 17.

*Primary Examiner* — Jason Chiang
(74) *Attorney, Agent, or Firm* — OPES IP Consulting Co., Ltd.

(57) ABSTRACT

An online signing system and method, a computing apparatus, and a computer-readable recording medium are provided. An assigned task is generated by a task assignment apparatus to the computing apparatus. The computing apparatus generates a signing request based on the assigned task to be transmitted to a client apparatus. The client apparatus downloads an assignment file from a storage database based on the signing request to display the assignment file on a display. The client apparatus receives an input via an input unit to generate a signature object on the assignment file, and transmits the signature object to the computing apparatus. After receiving the signature object, the computing apparatus combines the signature object and the assignment file to obtain a signed file, and transmits the signed file to the storage database.

18 Claims, 9 Drawing Sheets

(56) References Cited

U.S. PATENT DOCUMENTS

| | | | | |
|---|---|---|---|---|
| 10,110,385 | B1* | 10/2018 | Rush | H04L 9/3234 |
| 10,430,515 | B1* | 10/2019 | Ohme | G06F 40/171 |
| 11,119,649 | B1* | 9/2021 | Sahgal | H04W 4/022 |
| 11,538,122 | B1* | 12/2022 | Rakowicz | G06Q 20/3829 |
| 2005/0243199 | A1* | 11/2005 | Bohaker | H04N 1/00562 |
| | | | | 348/373 |
| 2007/0079128 | A1* | 4/2007 | Cheng | G06Q 10/00 |
| | | | | 713/176 |
| 2008/0072334 | A1* | 3/2008 | Bailey | G06Q 10/10 |
| | | | | 726/28 |
| 2008/0148054 | A1* | 6/2008 | Cahill | G06F 21/64 |
| | | | | 713/180 |
| 2013/0046991 | A1* | 2/2013 | Lu | H04L 9/3247 |
| | | | | 713/176 |
| 2013/0185565 | A1* | 7/2013 | Appelbaum | G06Q 40/08 |
| | | | | 713/176 |
| 2016/0048696 | A1* | 2/2016 | Follis | G06F 21/645 |
| | | | | 726/28 |
| 2017/0048285 | A1* | 2/2017 | Pearl | G06F 16/11 |
| 2017/0272249 | A1* | 9/2017 | Bhandarkar | H04L 9/3247 |
| 2017/0345394 | A1* | 11/2017 | Bansal | H04L 63/0838 |
| 2018/0129827 | A1* | 5/2018 | Picazo | G06F 21/64 |
| 2019/0036864 | A1* | 1/2019 | Reuss | H04W 12/108 |
| 2019/0354706 | A1* | 11/2019 | Bartlett | G16H 10/60 |
| 2019/0362430 | A1* | 11/2019 | Jass | G06Q 40/08 |
| 2019/0386833 | A1* | 12/2019 | Alger | H04L 9/3239 |
| 2020/0076612 | A1* | 3/2020 | Adluri | H04L 9/3239 |
| 2020/0301979 | A1* | 9/2020 | Alexiades | G06F 16/93 |
| 2020/0372202 | A1* | 11/2020 | Hayslett | H04L 9/3247 |
| 2021/0211299 | A1* | 7/2021 | Hussain | H01Q 15/14 |
| 2021/0250359 | A1* | 8/2021 | Yaacoby | H04L 63/0428 |
| 2022/0044333 | A1* | 2/2022 | Punzalan | G06Q 40/123 |
| 2022/0164480 | A1* | 5/2022 | Chavarria Gutierrez | |
| | | | | H04L 9/3268 |
| 2022/0247566 | A1* | 8/2022 | Krosuri | H04L 9/0894 |
| 2023/0038949 | A1* | 2/2023 | Kido | G06F 21/73 |
| 2023/0117628 | A1* | 4/2023 | Giffard-Burley | G06F 16/93 |
| | | | | 707/736 |
| 2023/0133618 | A1* | 5/2023 | Tsai | H04L 65/402 |
| | | | | 713/176 |
| 2023/0146348 | A1* | 5/2023 | Yu | H04L 9/3247 |
| | | | | 713/180 |
| 2024/0356915 | A1* | 10/2024 | Tu | H04L 9/3247 |

FOREIGN PATENT DOCUMENTS

| | | |
|---|---|---|
| EP | 2866157 | 4/2015 |
| TW | M563036 | 7/2018 |
| TW | M563036 U | 7/2018 |
| TW | 202042147 | 11/2020 |
| TW | 202042147 A | 11/2020 |

* cited by examiner

ONLINE SIGNING SYSTEM AND METHOD, COMPUTING APPARATUS, AND COMPUTER-READABLE RECORDING MEDIUM

CROSS-REFERENCE TO RELATED APPLICATION

This application claims the priority benefit of U.S. provisional application Ser. No. 63/272,694, filed on Oct. 28, 2021, and Taiwan application serial no. 111136214, filed on Sep. 23, 2022. The entirety of each of the above-mentioned patent applications is hereby incorporated by reference herein and made a part of this specification.

BACKGROUND

Technical Field

The disclosure relates to an electronic signature technology, and more particularly to an online signing system and method, a computing apparatus, and a computer-readable recording medium.

Description of Related Art

With the development of global e-commerce, many transactions are no longer limited to physical documents, and traditional paper documents are slowly being replaced by electronic documents. In the case where work efficiency is the focus, traditional modes such as handwritten signature and stamping can no longer meet the requirements of the electronic age, so the electronic signature technology is derived. The electronic signature technology replaces the traditional mode of pen and paper signature, and allows a user to sign an electronic document on an electronic apparatus.

However, the general electronic signature manner is often limited by the lack of software and hardware of a client apparatus such that a good electronic signature result cannot be obtained, for example, the resolution of signature strokes is insufficient or the smoothness of performing signature is insufficient. Therefore, how to enable the user to obtain a good electronic signature result in the conventional software and hardware architecture is one of the issues to be solved at present.

SUMMARY

The disclosure provides an online signing system and method, a computing apparatus, and a computer-readable recording medium, so that a user can obtain a good electronic signature result in a conventional software and hardware architecture.

An online signing system of the disclosure includes a task assignment apparatus, configured to generate an assigned task, wherein the assigned task corresponds to an assignment file, and the assignment file is associated with a file identifier; a storage database, configured to store the assignment file; a computing apparatus, configured to receive the assigned task from the task assignment apparatus, and generate a signing request based on the assigned task; and a client apparatus, configured to receive the signing request from the computing apparatus; download the assignment file from the storage database based on the signing request; display the assignment file on a display; and receive an input via an input unit to generate a signature object on the assignment file and transmit the signature object to the computing apparatus. The computing apparatus is further configured to combine the signature object and the assignment file to obtain a signed file after receiving the signature object.

A computing apparatus for an online signing system of the disclosure includes a storage unit, including one or more code fragments; and a processor, coupled to the storage unit and configured to execute the one or more code segments to receive an assigned task, and generate a signing request based on the assigned task; transmit the signing request to a client apparatus; receive a signature object corresponding to the signing request from the client apparatus; and combine the signature object and the assignment file to obtain a signed file.

An online signing method of the disclosure is used for an online signing system, and the online signing system includes a storage database, a computing apparatus, a client apparatus, and a task assignment apparatus. The online signing method includes the following steps. The task assignment apparatus generates an assigned task, and transmits the assigned task to the computing apparatus. The assigned task corresponds to an assignment file, and the assignment file is associated with a file identifier. The computing apparatus receives the assigned task, generates a signing request based on the assigned task, and transmits the signing request to the client apparatus. After receiving the signing request, the client apparatus downloads the assignment file from the storage database based on the signing request to display the assignment file on a display. The client apparatus receives an input via an input unit to generate a signature object on the assignment file, and transmit the signature object to the computing apparatus. After receiving the signature object, the computing apparatus combines the signature object and the assignment file to obtain a signed file.

A non-transitory computer-readable recording medium of the disclosure records at least one program command, and after the at least one program command is loaded into the electronic apparatus, the following steps are executed. An assigned task is received, and a signing request is generated based on the assigned task. The signing request is transmitted to a client apparatus. A signature object corresponding to the signing request is received from the client apparatus. The signature object and an assignment file are combined to obtain a signed file.

Based on the above, computations of the disclosure are concentrated in the computing apparatus, and the computing apparatus uniformly performing the merging of the document and the signature object can prevent different merging results due to software and hardware limitations of the client apparatus.

DETAILED DESCRIPTION OF DISCLOSED EMBODIMENTS

Figure 1:
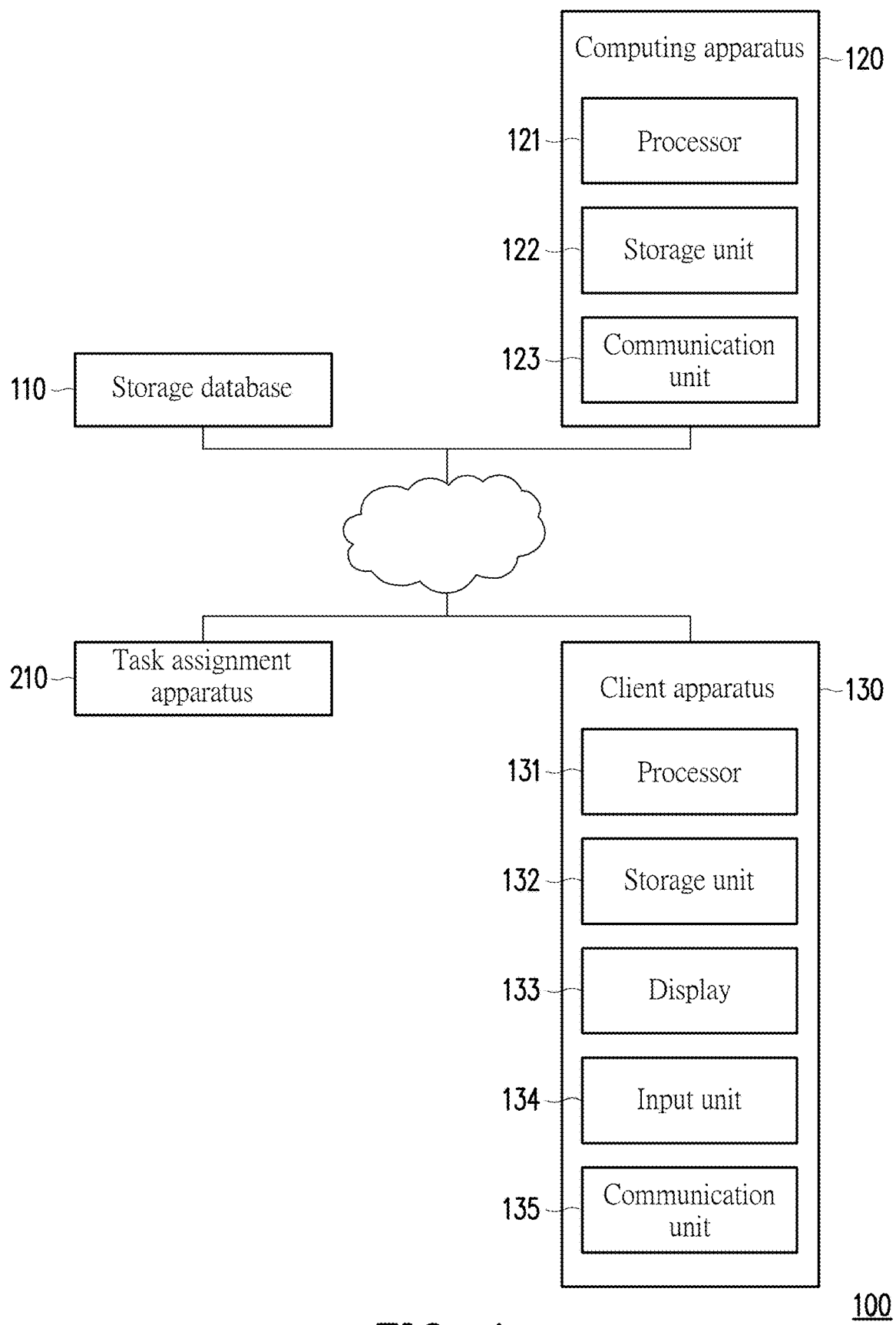
FIG. 1 is a block diagram of an online signing system according to an embodiment of the disclosure.

FIG. 1 is a block diagram of an online signing system according to an embodiment of the disclosure. Please refer to FIG. 1. An online signing system 100 includes a storage database 110, a computing apparatus 120, a client apparatus 130, and a task assignment apparatus 210. The storage database 110 and the computing apparatus 120 may be two independent cloud servers or may be disposed in the same cloud server. Here, the storage database 110, the computing apparatus 120, the client apparatus 130, and the task assignment apparatus 210 all have communication units, which may communicate through a wired or wireless transmission manner to mutually transmit and receive signals and data.

The storage database 110 is, for example, a server that provides an object storage service and is used to store an assignment file. The assignment file may be any document that needs to be signed. In an embodiment, the storage database 110 adopts Amazon Simple Storage Service and is used to store and protect any amount of data suitable for various usage cases, such as data lakes, websites, mobile applications, backup and restore, archives, enterprise applications, Internet of things (IoT) apparatuses, and big data analytics.

The computing apparatus 120 is used to receive an assigned task from the task assignment apparatus 210, and generate a signing request based on the assigned task. Here, the assigned task includes a file identifier and field information. The file identifier corresponds to an assignment file stored in the storage database 110. The computing apparatus 120 is an electronic apparatus or a server having computing functions and networking functions. For example, the computing apparatus 120 at least includes a processor 121, a storage unit 122, and a communication unit 123. The processor 121 is coupled to the storage unit 122 and the communication unit 123.

The client apparatus 130 is an electronic apparatus used by a user assigned to perform a signing action. For example, the client apparatus 130 may be implemented by adopting a personal computer, a notebook computer, a tablet computer, a smart phone, etc. The client apparatus 130 at least includes a processor 131, a storage unit 132, a display 133, an input unit 134, and a communication unit 135. The processor 131 is coupled to the storage unit 132, the display 133, the input unit 134, and the communication unit 135.

The processors 121 and 131 are, for example, central processing units (CPUs), physical processing units (PPUs), programmable microprocessors, embedded control chips, digital signal processors (DSPs), application specific integrated circuits (ASICs), or other similar apparatuses.

The storage units 122 and 132 are, for example, any type of fixed or removable random-access memories (RAMs), read-only memories (ROMs), flash memories, hard disks, other similar apparatuses, or combinations of the apparatuses. In the computing apparatus 120, the storage unit 122 includes one or more code fragments, and the code fragments are executed by the processor 121 after being installed. In addition, in the client apparatus 130, the storage unit 132 includes one or more code fragments, and the code fragments are executed by the processor 131 after being installed.

The communication units 123 and 135 may be chips or circuits adopting local area network (LAN) technology, wireless LAN (WLAN) technology, or mobile communication technology. The local area network is, for example, Ethernet. The wireless local area network is, for example, Wi-Fi. The mobile communication technology is, for example, global system for mobile communications (GSM), third-generation (3G) mobile communication technology, fourth-generation (4G) mobile communication technology, fifth-generation (5G) mobile communication technology, etc.

The display 133 is, for example, a liquid crystal display (LCD), a plasma display, etc. The input unit 134 is, for example, a handwriting pad or a touch panel and is used to receive handwriting tracks. Alternatively, the input unit 134 may also be an image capturing device and is used to capture images of seals or handwritten signatures. The image capturing device is, for example, a video camera, a camera, etc. adopting a charge coupled device (CCD) lens or a complementary metal oxide semiconductor transistor (CMOS) lens.

The hardware architecture of the storage database 110 is also designed like the computing apparatus 120 to include a processor, a storage unit, and a communication unit. The hardware architecture of the task assignment apparatus 210 is similar to that of the client apparatus 130, and the task assignment apparatus 210 is used by a task creator to generate an assigned task. In an embodiment, it may be set that the client apparatus 120 and the task assignment apparatus 210 are implemented by the same electronic apparatus. That is, in the case where the electronic apparatus is used by the task creator, the electronic apparatus is used as the task assignment apparatus 210; and in the case where the electronic apparatus is used by a signer, the electronic apparatus is used as the client apparatus 130. In another embodiment, the client apparatus 120 and the task assignment apparatus 210 may also be implemented by two independent electronic apparatuses.

The storage database 110, the computing apparatus 120, the client apparatus 130 and the task assignment apparatus 210 store one or more code fragments in their respective storage units and execute corresponding functions through their respective processors.

In the client apparatus 130, after receiving the signing request from the computing apparatus 120, the processor 131 downloads the assignment file corresponding to the file identifier from the storage database 110 based on the file identifier and the field information included in the signing request, and receives the corresponding field information from the computing apparatus 120. Next, the assignment file is displayed on the display 133, and a signature field is displayed at a designated position of the display 133 based on the field information. An input is received via the input unit 134 to generate a signature object on the signature field, and the signature object is transmitted to the computing apparatus 120.

In the computing apparatus 120, after receiving the signature object, the processor 121 combines the signature object and the assignment file downloaded from the storage database 110 to obtain a signed file, and then transmits the signed file to the storage database 110.

Figure 2:
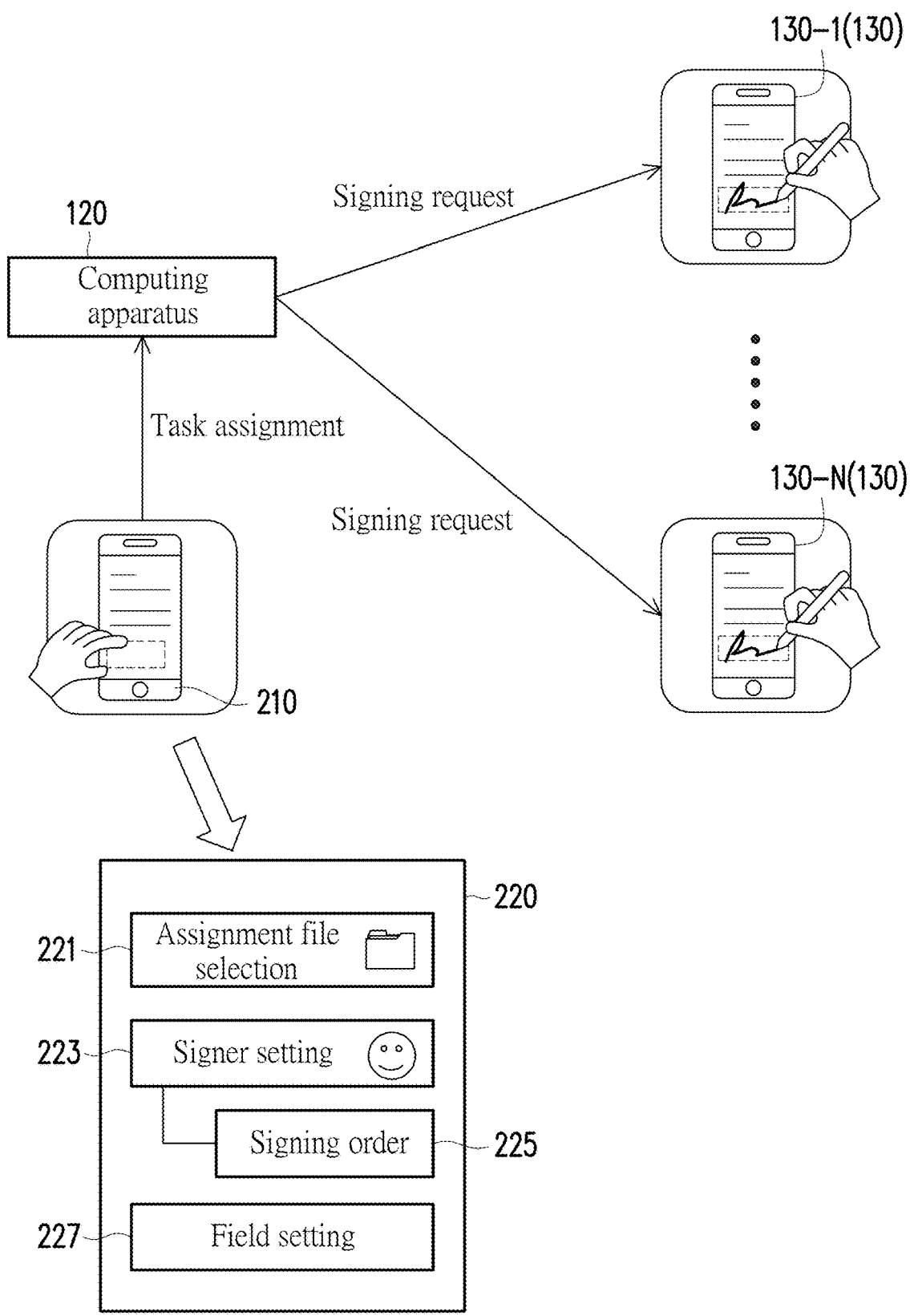
FIG. 2 is a schematic diagram of a signature assignment according to an embodiment of the disclosure.

An embodiment is given below to illustrate the process of creating (generating) the assigned task through the task assignment apparatus. FIG. 2 is a schematic diagram of a signature assignment according to an embodiment of the disclosure. In the embodiment, N signers are used as an example for description, and it is assumed that different signers use different client apparatuses 130-1 to 130-N. Here, the client apparatuses 130-1 to 130-N have the same functions and architectures as the client apparatus 130 shown in FIG. 1. The client apparatus 130 generally refers to one of the client apparatuses 130-1 to 130-N.

In an embodiment, the client apparatuses 130-1 to 130-N may be implemented by adopting different electronic apparatuses. In another embodiment, the same electronic apparatus may also be used by multiple signers to implement different client apparatuses.

In FIG. 2, the task creator generates the assigned task through the task assignment apparatus 210, and transmits the assigned task to the computing apparatus 120. The computing apparatus 120 generates the signing request corresponding to each signer based on a signing order in the assigned task, and sequentially transmits the signing request to the client apparatuses 130-1 to 131-N corresponding to each signer. Here, the computing apparatus 120 is set to continue to transmit the signing request of the next signer to the corresponding client apparatus only after obtaining the signed file each time.

The task assignment apparatus 210 is used to designate the assignment file, signer information, and the field information. That is, the task creator designates a document to be signed as the assignment file through the task assignment apparatus 210, and sets the signer information to determine who are the signers (one signer or multiple signers), while setting the signature field (the field information) corresponding to each signer. In response to the signer information including multiple signers, the task assignment apparatus 210 further adds the signing order to the assigned task.

In an embodiment, the task assignment apparatus 210 may first connect to a task creation interface 220 provided by the computing apparatus 130. The task creator must register with the computing apparatus 130 in advance. After the task assignment apparatus 210 is connected to the task creation interface 220, the computing apparatus 130 further confirms whether the task creator using the task assignment apparatus 210 has the permission to use the storage database 110. After the task assignment apparatus 210 confirms to the computing apparatus 130 that the task creator has the permission to use the storage database 110, the task creator may generate the assignment file through the task creation interface 220. The task creation interface 220 includes options 221 to 227. The option 221 is used to select the assignment file. The assignment file may be selected from a folder inside the task assignment apparatus 210. After the assignment file is selected, the assignment file is uploaded to the storage database 110 by the task assignment apparatus 210. In addition, the storage database 110 classifies and archives the assignment file, then generates the corresponding file identifier, and provides the file identifier to the task assignment apparatus 210.

In another embodiment, after the task assignment apparatus 210 confirms to the computing apparatus 130 that the task creator has the permission to use the storage database 110, the storage database 110 may also provide the assignment file. For example, a file selection page is provided by the storage database 110 for the task creator to select through the task assignment apparatus 210. After pressing the option 221, the file selection page provided by the storage database 110 is linked to for selection. That is, multiple files are stored in the storage database 110, and each file has a corresponding file identifier. After the task assignment apparatus 210 presses the option 221 to connect to the file selection page, the task assignment apparatus 210 selects one of the files as the assignment file. Afterwards, the storage database 110 provides the file identifier corresponding to the assignment file to the task assignment apparatus 210.

Additionally, the option 223 is used to set one or more signers. The option 225 is used to set the signing order of the signers after multiple signers have been selected. The option 227 is used to set the field information of the signature field in the assignment file.

The task assignment apparatus 210 sets one or more signers (the signer information) through the option 223. If multiple signers are set, the signing order is further set through the option 225. Also, the field that each signer is to sign (the field information) in the assignment file is designated through the option 227. Then, the task assignment apparatus 210 generates the assigned task based on the file identifier, the signer information, and the field information, and transmits the assigned task to the computing apparatus 120. Based on this, the computing apparatus 120 may generate and transmit the signing request to the designated client apparatus 130 based on the assigned task.

Figure 3:
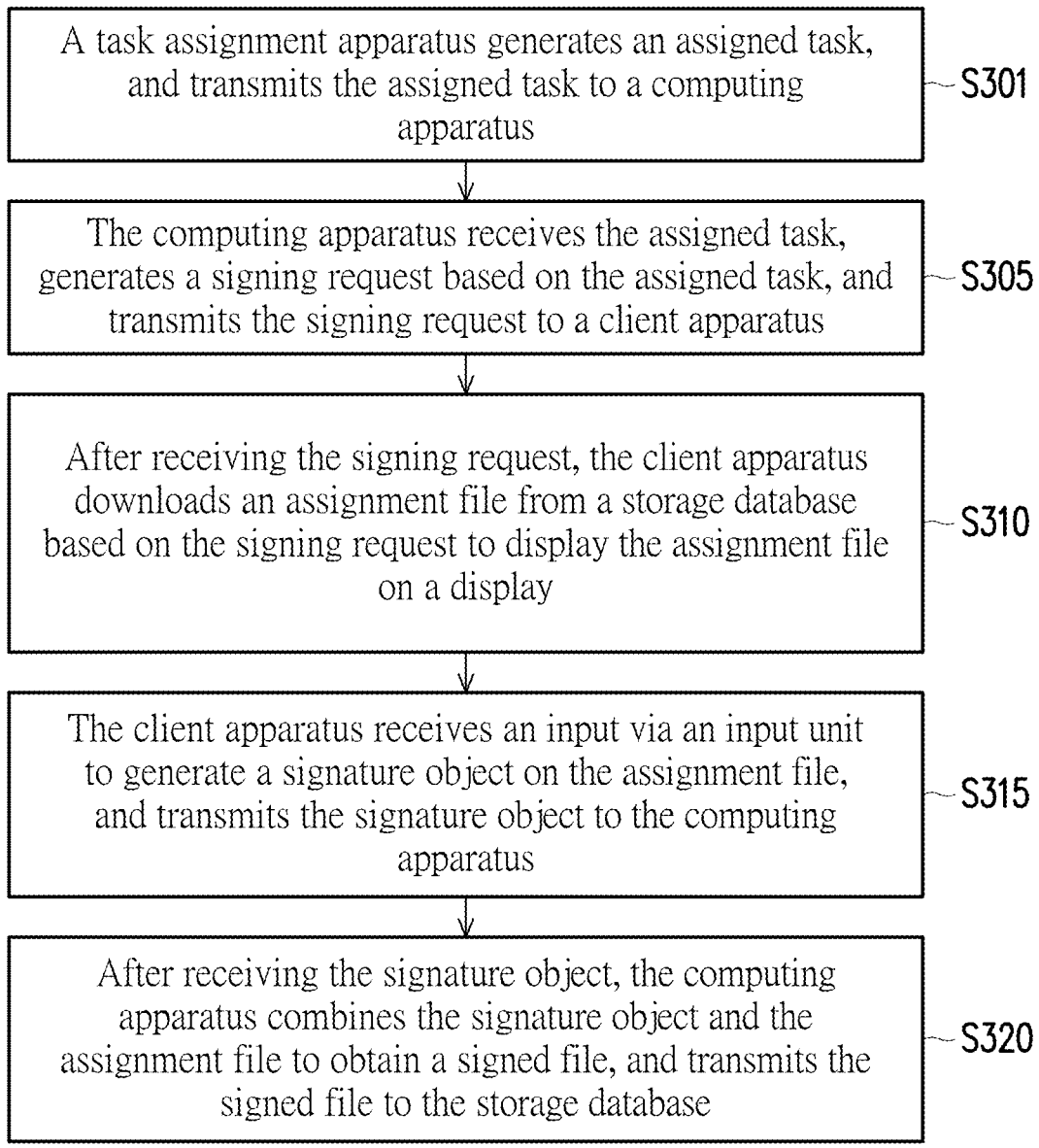
FIG. 3 is a flowchart of an online signing method according to an embodiment of the disclosure.

FIG. 3 is a flowchart of an online signing method according to an embodiment of the disclosure. Please refer to FIG. 1 and FIG. 3. In Step S301, the task assignment apparatus 210 generates the assigned task, and transmits the assigned task to the computing apparatus 120.

Next, in Step S305, the computing apparatus 120 receives the assigned task, generates the signing request based on the assigned task, and transmits the signing request to the client apparatus 130. In an embodiment, the computing apparatus 120 generates the signing request based on a token format, so that the client apparatus 130 can open the signing request without logging in. The token format is, for example, JSON web token (JWT). The JWT is used to securely transmit a message as a JSON object between two parties. The message is digitally signed, so the message may be verified and trusted. A person who receives the signing request does not need to register and log in. The benefit of the JWT is that different mechanisms are given to different roles to verify their identities. The signer can also complete signing without registering an account with the computing apparatus 120, and the required information can be obtained and verified as long as the encrypted token is unlocked, thereby achieving login-free signing. If the signer is registered with the computing apparatus 120, the signer may also sign after logging in.

The signing request is, for example, a uniform resource locator (URL) address. After opening (displaying) an email through the client apparatus 130, the signer may click on the URL address to enable the signing request through a mouse, a touch panel, a handwriting pad, etc. of the client apparatus 130. The signing request includes a task identifier, representing an assigned task; the file identifier, representing the assignment file allocated in the assigned task; a signer identifier, representing each signer assigned by the assigned task; an email address, representing the email address corresponding to each signer; and an expiration time, representing a valid time limit of the signing request.

In Step S310, after receiving the signing request, the client apparatus 130 downloads the assignment file from the storage database 110 based on the signing request to display the assignment file on the display 133.

Afterwards, in Step S315, the client apparatus 130 receives the input via the input unit 134 to generate the signature object on the assignment file, and transmits the signature object to the computing apparatus 120. The signature object is, for example, a handwritten signature track, an image, etc. For example, in the case where the input unit 134 is implemented by adopting a handwriting pad or a touch panel, the signature object is a handwritten signature track. In the case where the input unit 134 is implemented by adopting an image capturing device, the signature object is a seal image or a handwritten signature image. In addition, the client apparatus 130 may further upload an attached file (for example, a photo or a document) to the computing apparatus 120.

In other embodiments, the signature field may be further provided for the user to sign. That is, the field information is received from the computing apparatus 120, and the signature field is displayed at the designated position of the display 133 based on the field information. The client apparatus 130 generates the signature object on the signature field based on receiving the input via the input unit 134.

Here, the downloaded assignment file and field information are temporarily stored in a temporary storage region of the client apparatus 130. The client apparatus 130 may also be set to delete the downloaded assignment file and field information from the temporary storage region after generating the signature object. Alternatively, the client apparatus 130 is set to delete temporarily stored data in the temporary storage region at regular intervals.

Then, in Step S320, after receiving the signature object, the computing apparatus 120 combines the signature object and the assignment file to obtain the signed file, and transmits the signed file to the storage database 110. In an embodiment, the computing apparatus 120 may request the storage database 110 to download the corresponding assignment file after receiving the signature object. In other embodiments, the computing apparatus 120 may also request the storage database 110 to download the corresponding assignment file after transmitting the signing request to the client apparatus 130.

In order to ensure security, the expiration time is set in the signing request transmitted by the computing apparatus 120 to the signer without registration. For example, if the expiration time is set to 2 days, the signing request will be automatically invalidated 2 days after the signing request is generated. After judging that the signing request has expired, the client apparatus 130 transmits a re-acquisition request to the computing apparatus 120. After receiving the re-acquisition request, the computing apparatus 120 regenerates the signing request, then transmits the regenerated signing request to the client apparatus 130, and transmits a notification to the task assignment apparatus 210 that generates the assigned task.

In another embodiment, after judging that the signing request has expired, the client apparatus 130 is configured to transmit the re-acquisition request to the task assignment apparatus 210 that generates the assigned task to notify the computing apparatus 120 through the task assignment apparatus 210, and the computing apparatus 120 regenerates the signing request and transmits the regenerated signing request to the client apparatus 130.

In an implementation, if the signing request expires, a screen will display that a link has expired when a recipient (the signer) clicks on the link to enter the original signing request. The recipient may click an option on the screen to re-transmit the link. Next, the recipient receives a new invitation link (the new signing request) from an email box, and clicks the re-acquired signing request to perform the signing action. After the recipient performs the action of re-acquiring the new signing request, the computing apparatus 120 notifies the task creator, for example, transmits an email to an email box of the task creator.

The online signing action is completed through Steps S301 to S320. Single-person online signing and multi-person online signing are respectively exemplified below.

Figure 4:
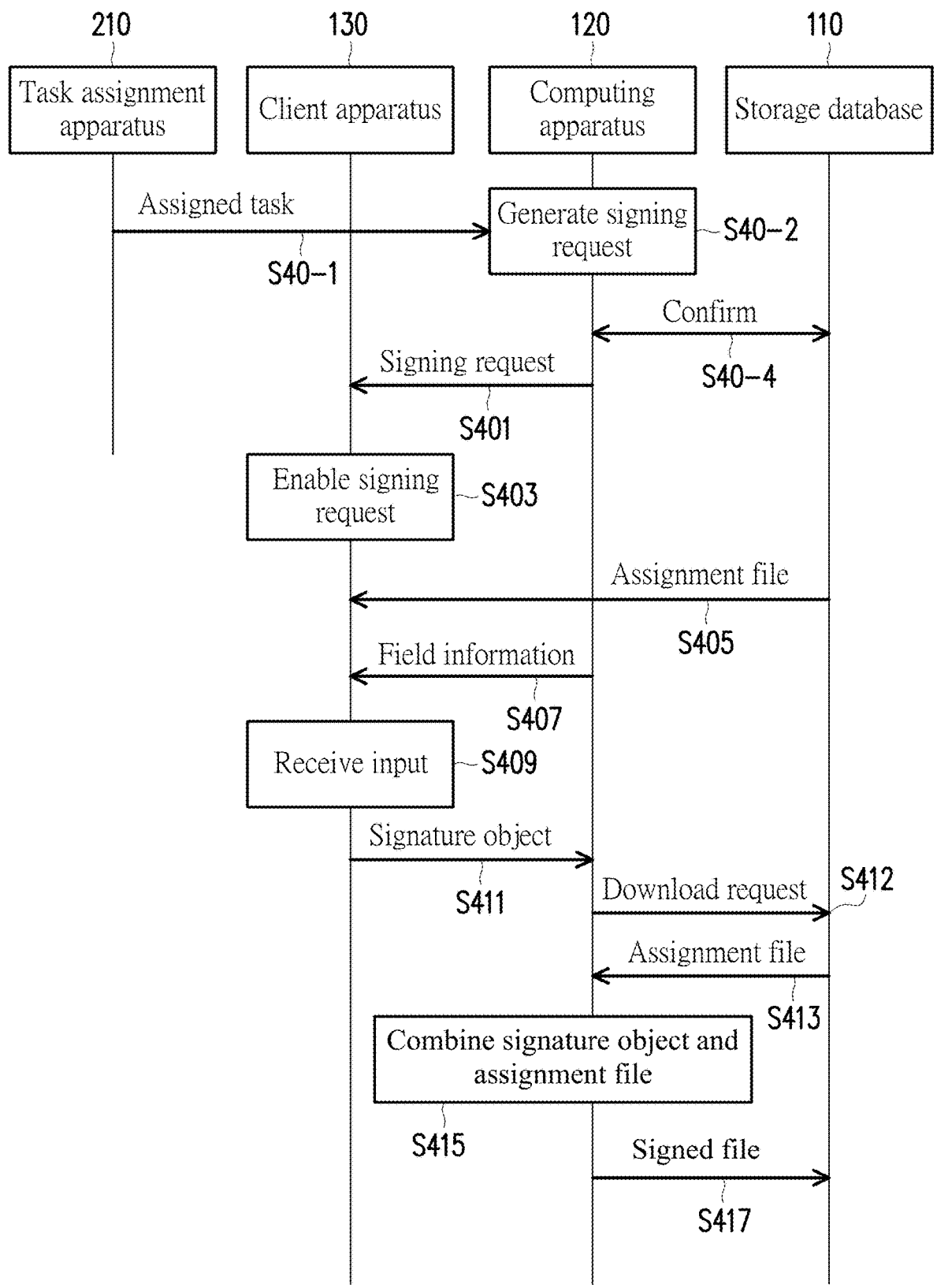
FIG. 4 is a schematic flowchart of a single-person online signing method according to an embodiment of the disclosure.

FIG. 4 is a schematic flowchart of a single-person online signing method according to an embodiment of the disclosure. Please refer to FIG. 4. In Step S40-1, the task assignment apparatus 210 transmits the assigned task (including only one signer) to the computing apparatus 120. Accordingly, the computing apparatus 120 includes the file identifier and the field information. In Step S40-2, the computing apparatus 120 generates the signing request based on the assigned task. Then, in Step S40-4, the computing apparatus 120 confirms with the storage database 110, that is, transmits the file identifier to the task assignment apparatus 210 to confirm whether there is the corresponding assignment file in the storage database 110.

Next, in Step S401, the computing apparatus 120 transmits the signing request to the client apparatus 130 corresponding to the signer. In an embodiment, an email box of the signer is recorded in the assigned task, and after generating the corresponding signing request based on the assigned task, the computing apparatus 120 encapsulates the signing request as an email to be transmitted to the email box. Here, Step S401 may be implemented with reference to the description of Step S305.

After the client apparatus 130 receives the signing request, in Step S403, the signing request is enabled, so that the client apparatus 130 may be connected to the storage database 110 and the computing apparatus 120. After connecting, in Step S405, the client apparatus 130 downloads the assignment file based on the file identifier, and in Step S407, the client apparatus 130 downloads the corresponding field information from the computing apparatus 120. Here, Steps S403, S405, and S407 may be implemented with reference to the description of Step S310.

Next, in Step S409, the client apparatus 130 receives the input through the input unit 134 to generate the signature object. Then, in Step S411, the client apparatus 130 transmits the signature object to the computing apparatus 120. Here, Steps S409 and S411 may be implemented with reference to the description of Step S315. Moreover, in Step S412, the computing apparatus 120 transmits a download request to the storage database 110, so as to download the assignment file from the storage database 110 in Step S413. That is, after receiving the signature object, the computing apparatus 120 may obtain the file identifier based on the previously transmitted signing request, thereby transmitting the download request to the storage database 110 and downloading the assignment file based on the file identifier. In other embodiments, the computing apparatus 120 may also transmit the download request to the storage database 110 to download the assignment file after transmitting the signing request. That is, a time point at which the computing apparatus 120 downloads the assignment file may be before receiving the signature object or after receiving the signature object.

Then, in Step S415, the computing apparatus 120 may combine the signature object and the assignment file to obtain the signed file. Then, in Step S417, the computing apparatus 120 transmits the signed file to the storage database 110. Here, Steps S413, S415, and S417 may be implemented with reference to the description of Step S320.

Figure 5:
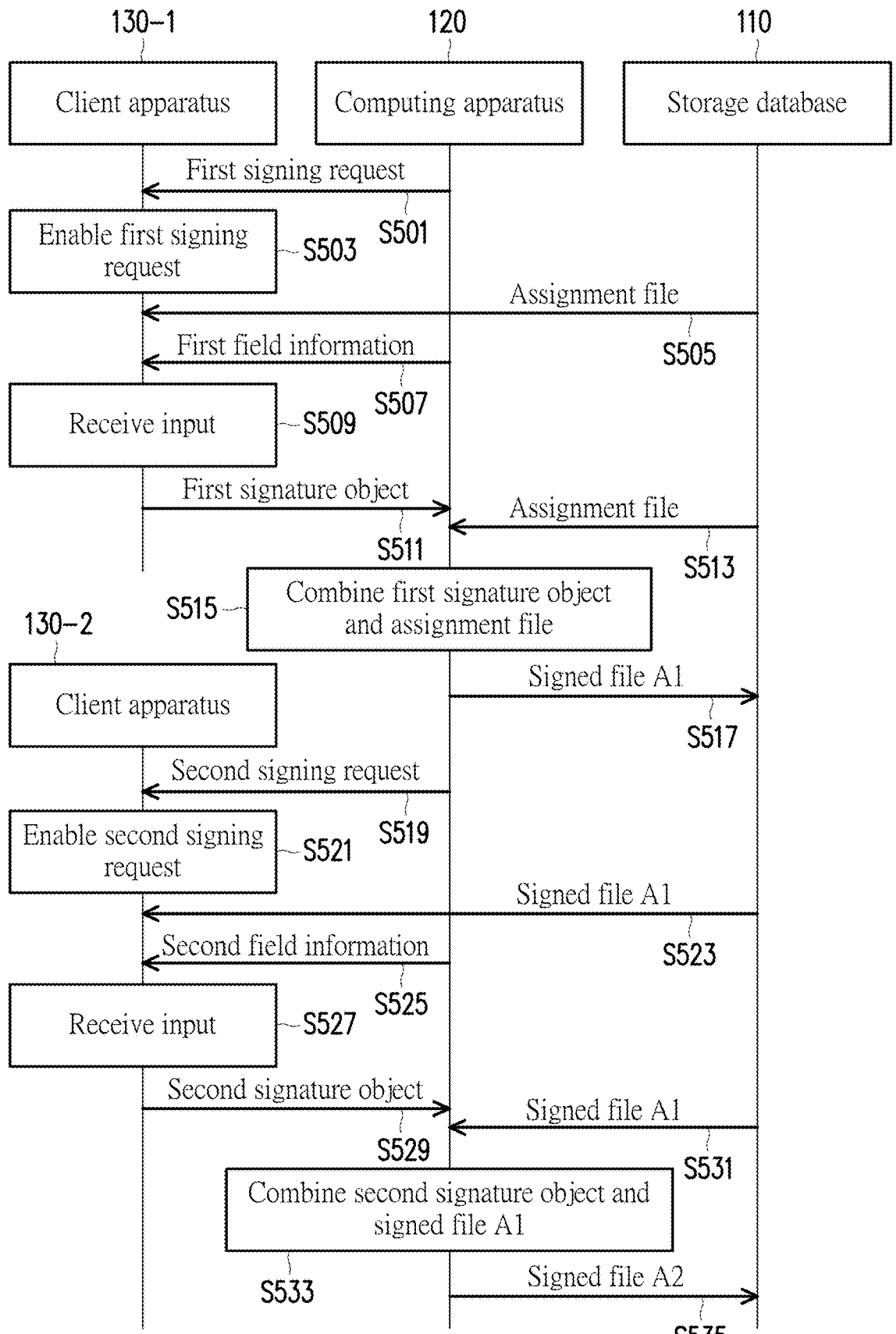
FIG. 5 is a schematic flowchart of a multi-person online signing method according to an embodiment of the disclosure.

FIG. 5 is a schematic flowchart of a multi-person online signing method according to an embodiment of the disclosure. In the embodiment, for the convenience of description, only two signers (respectively corresponding to the client apparatuses 130-1 and 130-2) are used for description. However, the disclosure is not limited thereto and may be analogized to three or more signers.

Please refer to FIG. 5. In Step S501, the computing apparatus 120 transmits a first signing request to the client apparatus 130-1. After receiving the first signing request, in Step S503, the client apparatus 130-1 enables a first signing request to connect to the storage database 110 and the computing apparatus 120. Next, in Step S505, the client apparatus 130-1 downloads the assignment file based on the file identifier, and in Step S507, the client apparatus 130-1 downloads the corresponding field information from the computing apparatus 120.

Then, in Step S509, the client apparatus 130-1 receives the input through the input unit 134 to generate a first signature object (corresponding to a first signer). After that, in Step S511, the client apparatus 130-1 transmits the first signature object to the computing apparatus 120. In Step S513, the computing apparatus 120 downloads the assignment file from the storage database 110. Then, in Step S515, the computing apparatus 120 combines the first signature object and the assignment file to obtain a signed file A1, and in Step S517, the computing apparatus 120 transmits the signed file A1 to the storage database 110. Here, Steps S501 to S517 are the same as Steps S401 to S417.

During the process of multi-person online signing, after receiving the signed file A1 from the computing apparatus 120, the storage database 110 may replace the signed file A1 with the assignment file for subsequent downloading based on the file identifier.

Next, in Step S519, the computing apparatus 120 transmits a second signing request to the client apparatus 130-2 (corresponding to a second signer). After receiving the second signing request, in Step S521, the client apparatus 130-2 enables the second signing request to connect to the storage database 110 and the computing apparatus 120. Next, in Step S523, the client apparatus 130-2 downloads the signed file A1 based on the file identifier, and in Step S525, the client apparatus 130-2 downloads second field information corresponding to the second signer from the computing apparatus 120.

Then, in Step S527, the client apparatus 130-1 receives the input through the input unit 134 to generate a second signature object (corresponding to the second signer). Then, in Step S529, the client apparatus 130-2 transmits the second signature object to the computing apparatus 120. In Step S531, the computing apparatus 120 may obtain the file identifier based on the previously transmitted second signing request, thereby connecting to the storage database 110 and download the signed file A1 based on the file identifier. Then, in Step S533, the computing apparatus 120 combines the second signature object and the signed file A1 to obtain a signed file A2. Moreover, in Step S535, the signed file A2 is transmitted to the storage database 110. By analogy, the signing request is transmitted to each signer one by one to perform the signing action.

Figure 6:
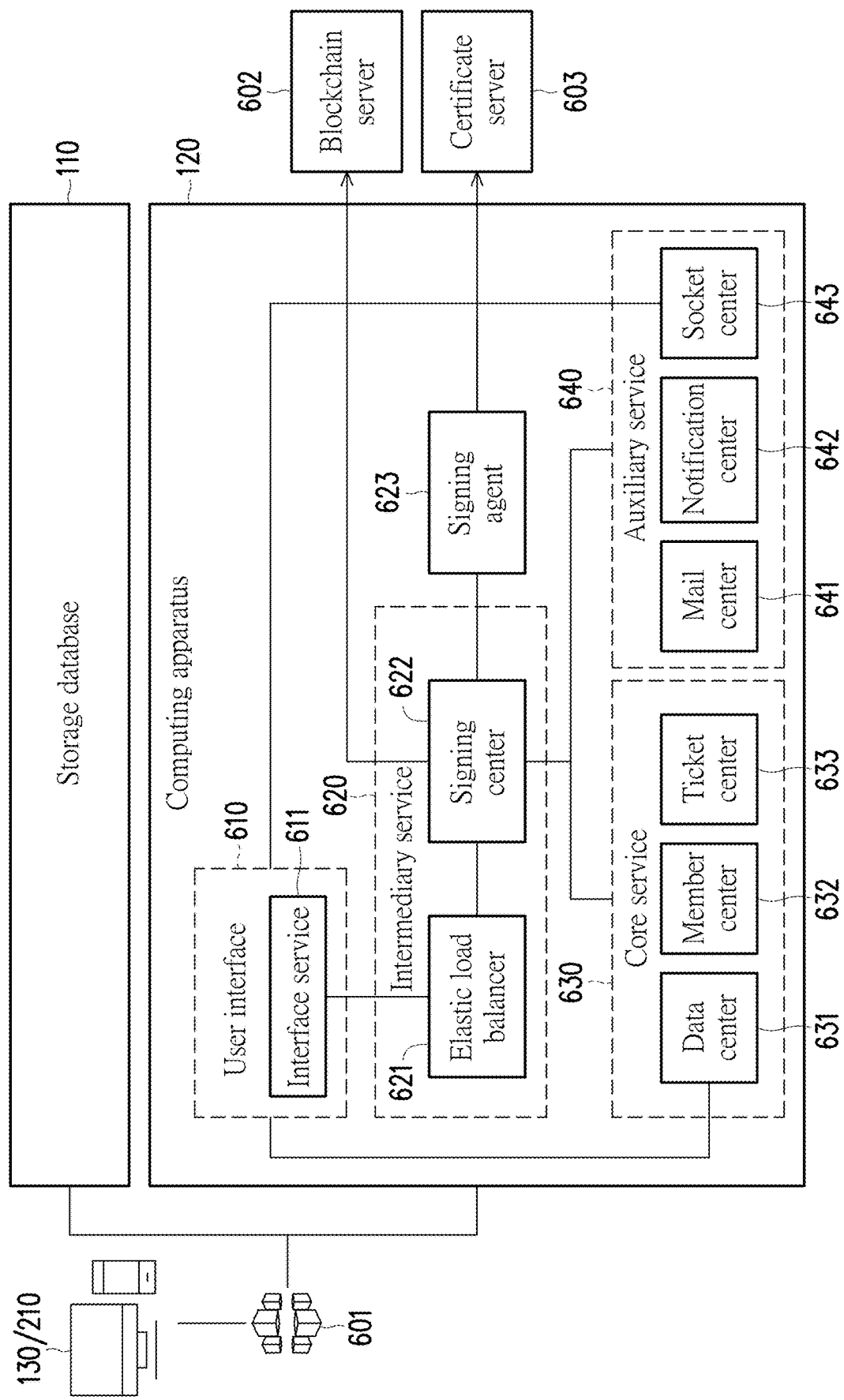
FIG. 6 is a block diagram of a microservice system architecture according to an embodiment of the disclosure.

FIG. 6 is a block diagram of a microservice system architecture according to an embodiment of the disclosure. In the embodiment, the storage database 110, the computing apparatus 120, and the client apparatus 130 (and/or the task assignment apparatus 210) may be connected to each other through a content delivery network or a content distribution network (CDN) 601.

The computing apparatus 120 is a cloud server, which uses the processor 121 to execute various components and various services therein. Here, the computing apparatus 120 adopts an elastic compute cloud (EC2) to provide a user interface 610, an intermediary service 620, a core service 630, and an auxiliary service 640, and is also provided with a signing agent 623.

The user interface 610 is used to provide an interface service 611 for the client apparatus 130/task assignment apparatus 210 to use, and data is rendered to a web front end through the interface service 611. For example, after the client apparatus 130 establishes a connection with the computing apparatus 120, the signature field may be displayed on the display 133 of the client apparatus 130 via the interface service 611.

The intermediary service 620 includes an elastic load balancer 621 and a signing center 622. The elastic load balancer 621 is used to be responsible for handling traffic. When the interface service 611 needs to access data, obtain permission, etc., the interface service 611 transmits a request to the elastic load balancer 621. When there are many requests, distribution may be performed through the elastic load balancer 621. The signing center 622 is used to store the field information of each assigned task and be responsible for receiving and storing the signature object, and responsible for combining the signature object and the assignment file to obtain the signed file.

The core service 630 is responsible for communicating with the storage database 110 and is used to store member data. The core service 630 includes a data center 631, a member center 632, and a ticket center 633. The member center 632 is used to record member data (account, password, personal information, etc.) of registered members. The registered members may be task creators or general signers. Here, the task creator needs to register with the computing apparatus 120 in advance, that is, if the task creator intends to establish the assigned task, the task creator must first log in to the computing apparatus 120. The general signer may connect to the computing apparatus 120 based on the signing request to use services thereof without registration.

The ticket center 633 is used to record whether the registered member has made consumption in the services provided by the computing apparatus 120. The more the consumption made by the member, the more the permission to use. For example, a storage capacity that the registered member may access in the storage database 110 is determined based on consumption records. The data center 631 is used to host the storage database 110. For example, the data center 631 records the capacity of the storage database 110 that the registered member may access, which files have been stored in the storage database 110, etc.

When the task assignment apparatus 210 intends to request the permission to access the storage database 110 from the computing center 120, the signing center 622 knows that the assigned task of the registered member who issued the request needs an uploading location, so the signing center 622 notifies the data center 631, so as to notify the storage database 110 through the data center 631.

The auxiliary service 640 is used to provide a transmission function to transmit the signing request. The auxiliary service 640 includes a mail center 641, a notification center 642, and a socket center 643. The mail center 641 is responsible for transmitting the email (the signing request) to the designated email box. The notification center 642 is responsible for application-to-application (A2A) and application-to-person (A2P) communications. The socket center 643 is responsible for transmitting a message to a web page.

The signing agent 623 captures a designated feature from the signed file, and transmits the designated feature to a certificate server 603, so that the certificate server 603 generates a verified object to be transmitted back to the signing agent 623. The designated feature includes a hash value or other information in the file. Afterwards, the signing agent 623 adds the verified object to the signed file. Here, the verified object is, for example, a digital certificate. The role of the digital certificate is to prove that the user listed in the certificate legally owns a public key listed in the certificate. The digital certificate includes a certificate serial number, a user name, the public key, a certificate validity period, and a time stamp.

In an embodiment, the certificate server 603 uses public key infrastructure (PKI) technology to issue the digital certificate. The signing agent 623 adds the digital certificate to the completed signed file to protect the signed file from external alteration or corruption, and ensure the integrity of the signed file obtained from the storage database 110. Assuming that the signed file is a portable document format (PDF) file, if the signed file is altered, a certificate abnormality notification will appear on a PDF reader.

The certificate server 603 is, for example, a third-party certificate authority set up based on a PKI architecture. The PKI architecture includes a user, that is, a person or an institution using a PKI; a certification authority (CA), that is, a person or an institution issuing the certificate; a repository, that is, a database storing certificates; and a registration authority (RA). After checking by the third-party certificate authority, the signature object can be uniquely identifiable and irreversible.

In addition, the signing center 622 further uses blockchain technology to calculate a verification value corresponding to each interactive action based on the interactive action between the client apparatus 130 and the computing apparatus 120, and transmits the verification value to a blockchain server 602. The verification value is, for example, the hash value. The blockchain server 602 adopts IOTA technology, which is a distributed ledger technology (DLT), overcomes the inefficiencies of current blockchain designs, and introduces a new consensus method in a decentralized peer-to-peer solution.

During the signing process, for each interactive action that the signer interacts with the computing apparatus 120 through the client apparatus 130, the signing center 622 calculates the corresponding verification value for the interactive action, and uploads the verification value to the blockchain server 602 to protect the file from external alteration or corruption, and ensure the integrity of the file in transit. If the user has doubts about the process file, the user may apply to the computing apparatus 12 for comparison and confirmation with the file in the blockchain server 602.

Compared with the full stack system architecture, the microservice system architecture is easier to complete development and system changes. Since each change is only a single or partial microservice, deployment is faster than full stack. Individual microservices are more focused on a single task, so the impact and risk of deployment errors are lower than full stack. Resources may be allocated for some resource-constrained microservices, so the flexibility and efficiency of resource utilization are higher than full stack.

In an embodiment, a desktop or a laptop computer operated by the signer may not support a touch screen or have an additional handwriting apparatus, so the signer can only use a relatively small touchpad provided on the laptop or a mouse to sign. However, the input unit such as the touchpad or the mouse is not suitable for signing words with complex strokes (for example, Chinese, etc.), and may not even be sensitive enough to detect movements of a fingertip. The signer has to repeat actions of clearing/re-signing to achieve a satisfactory and recognizable signature. Accordingly, a hand-drawing function may be further provided on the client apparatus 130 to serve as an extension of a signing pad through a mobile apparatus, which is exemplified below.

Figure 7A:
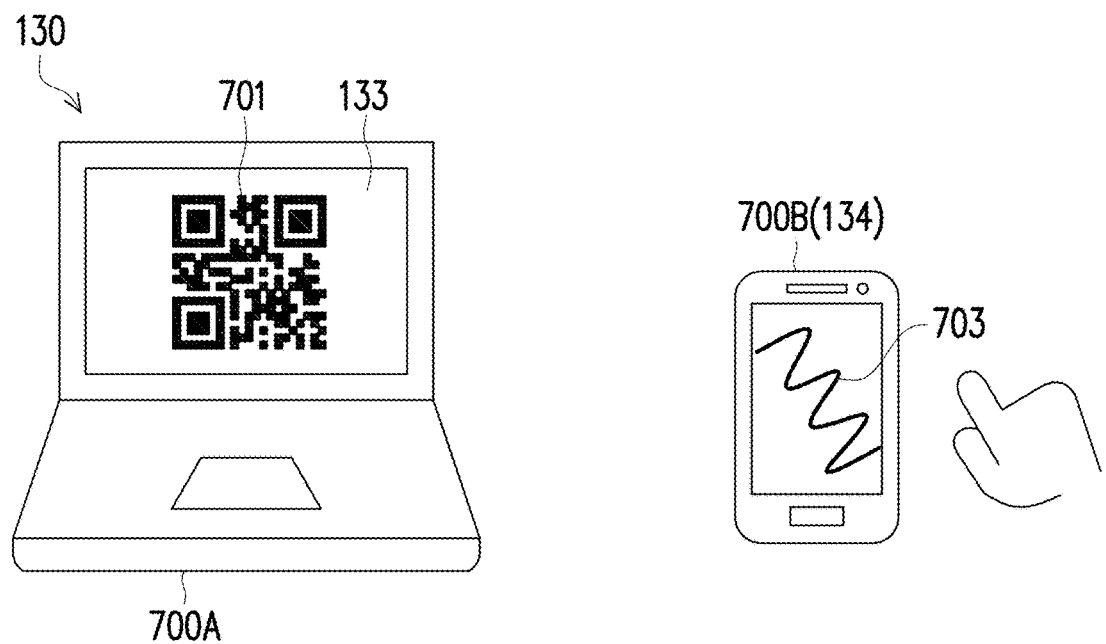
FIG. 7A and FIG. 7B are schematic diagrams of an application example of a client apparatus according to an embodiment of the disclosure.
Figure 7B:
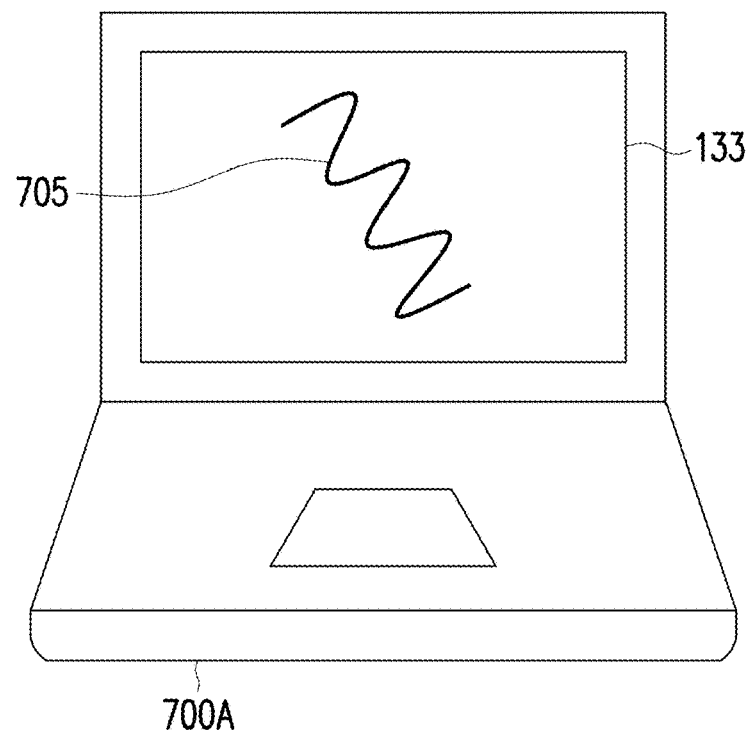

FIG. 7A and FIG. 7B are schematic diagrams of an application example of a client apparatus according to an embodiment of the disclosure. In the embodiment, a notebook computer is used as a host 700A of the client apparatus 130, and a mobile apparatus 700B is used to implement the input unit 134 in the above embodiment.

Please refer to FIG. 1, FIG. 7A, and FIG. 7B at the same time. When the signer connects to the computing apparatus 120 through the host 700A and intends to sign or edit a signature, a bar code 701 is displayed on the display 133 of the host 700A for the mobile apparatus 700B to scan, so as to turn the mobile apparatus 700B into a mobile sketchpad. In the case where the mobile apparatus 700B does not need to log in to the computing apparatus 120, a handwriting input 703 may be directly received through a touch screen of the mobile apparatus 700B itself, and a signature object 705 corresponding to the handwriting input 703 may be simultaneously displayed on the display 133 as shown in FIG. 7B.

Figure 8:
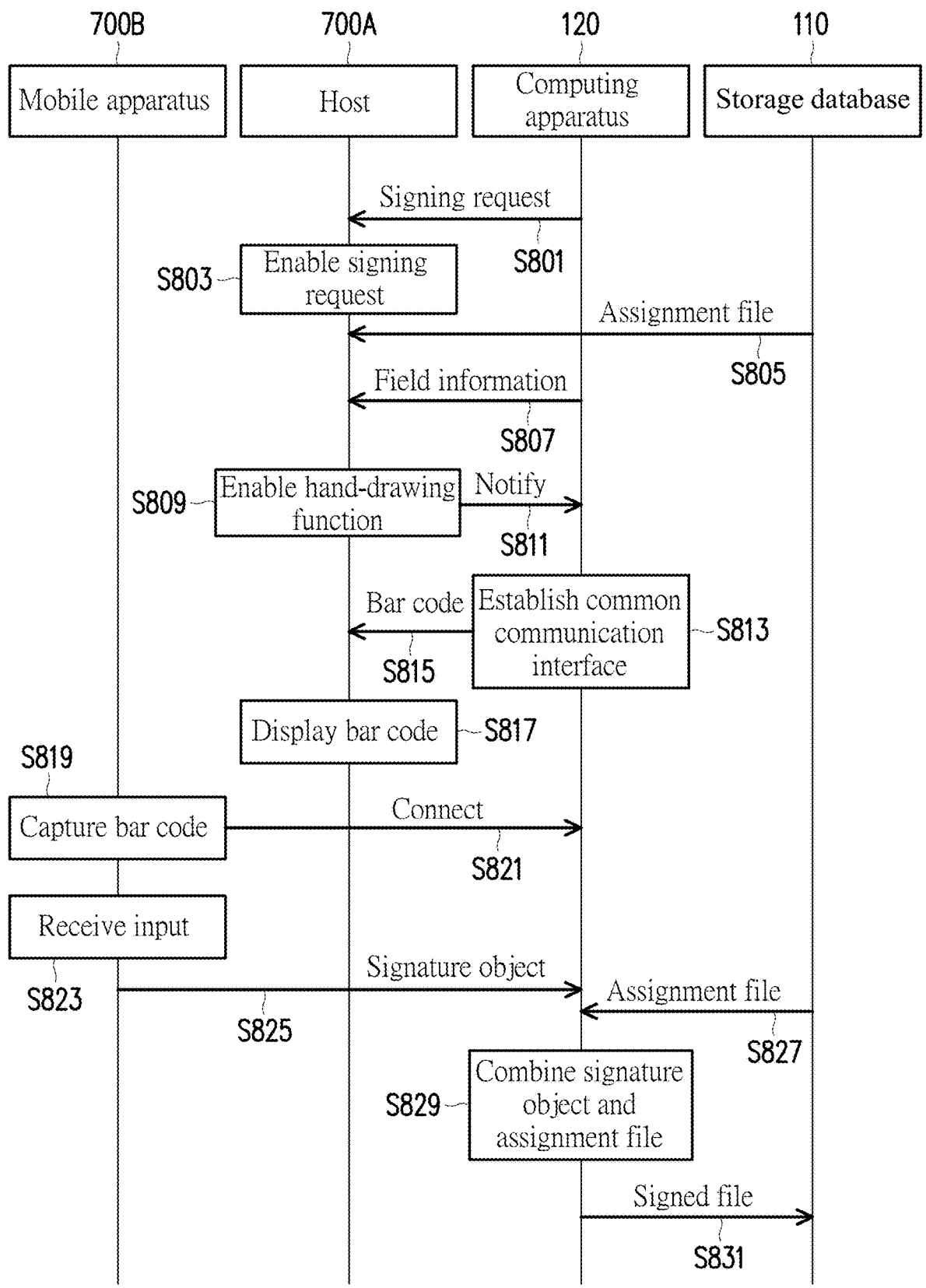
FIG. 8 is a schematic flowchart of an online signing method according to an embodiment of the disclosure.

Next, based on the architecture of FIG. 7A and FIG. 7B, the process of another online signing method is exemplified. FIG. 8 is a schematic flowchart of an online signing method according to an embodiment of the disclosure. Please refer to FIG. 7A, FIG. 7B, and FIG. 8. After the task assignment apparatus 210 transmits the assigned task (including only one signer) to the computing apparatus 120, in Step S801, the computing apparatus 120 transmits the signing request to the host 700A corresponding to the signer. Here, Step S801 may be implemented with reference to the description of Step S305.

After receiving the signing request, in Step S403, the host 700A enables the signing request, so that the host 700A can connect to the storage database 110 and the computing apparatus 120. After connecting, in Step S805, the host 700A downloads the assignment file based on the file identifier, and in Step S807, the host 700A downloads the corresponding field information from the computing apparatus 120. Here, Steps S803, S805, and S807 may be implemented with reference to the description of Step S310.

Next, in Step S809, the host 700A enables the hand-drawing function, and in Step S811, the host 700A notifies the computing apparatus 120 to establish a common communication interface. In Step S815, the host 700A receives the bar code corresponding to the common communication interface from the computing apparatus 120. Moreover, in Step S817, the host 700A displays the bar code 701 on the display 133. Here, the bar code is, for example, a quick response code (QR code).

In Step S819, the mobile apparatus 700B captures the bar code 701 displayed by the display 133 through the image capturing device. Moreover, in Step S821, the mobile apparatus 700B is connected to the common communication interface provided by the computing apparatus 120 based on the bar code 701, so as to display the common communication interface on the touch screen of the mobile apparatus 700B. In Step S823, the mobile apparatus 700B receives the handwriting input 703 via the touch screen, so as to simultaneously generate the signature object 705 corresponding to the handwriting input 703 on the common communication interface displayed on the touch screen and the signature field displayed on the display 133.

In other embodiments, it may be further designed such that the client apparatus 130 receives an attachment requirement corresponding to the assignment file from the computing apparatus 120 based on the signing request, and displays an attachment function on the display 133. The client apparatus 130 selects an additional image file through the attachment function, and simultaneously transmits the additional image file to the computing apparatus 120 when transmitting the signature object to the computing apparatus 120. After receiving the additional image file, the computing apparatus 120 transmits the additional image file associated with the signed file to the storage database 110.

In addition, after receiving the additional image file and obtaining the signed file, the computing apparatus 120 generates a merged file based on the signed file and the additional image file through the signing center 622, then captures the designated feature from the merged file through the signing agent 623, and transmits the designated feature to the certificate server 603 to obtain the verified object from the certificate server 603, so as to add the verified object to the merged file.

Figure 9:
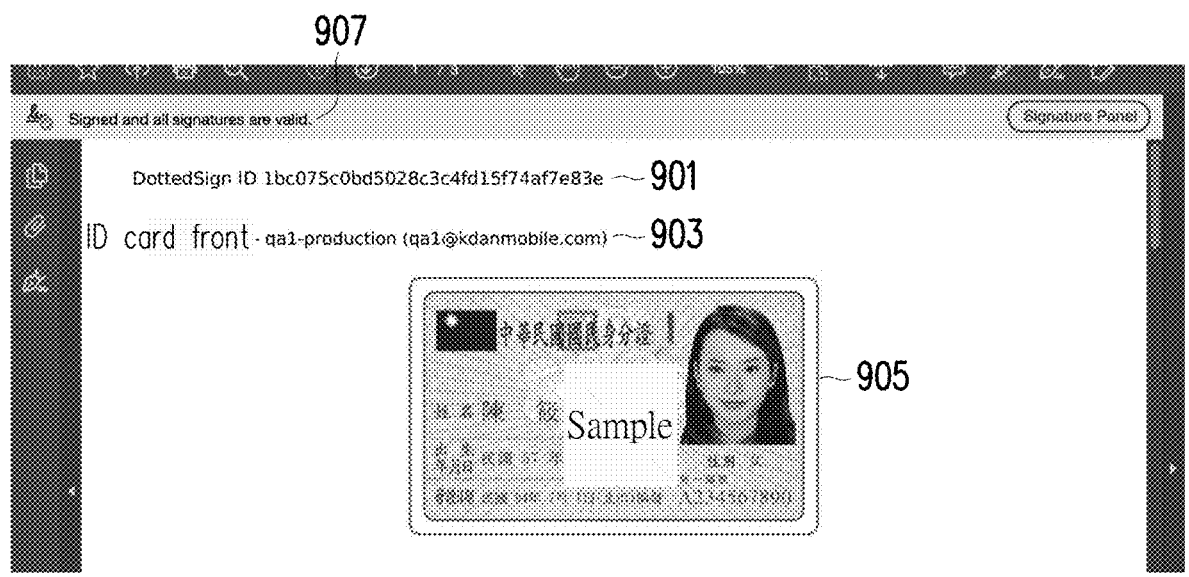
FIG. 9 is a schematic diagram of a merged file according to an embodiment of the disclosure.

FIG. 9 is a schematic diagram of a merged file according to an embodiment of the disclosure. Please refer to FIG. 9. In the embodiment, a related page of the additional image file merged into the merged file has a specific format, including a top header 901, an attachment title 903, and an additional image file 905. The format of the top header 901 is "DottedSign ID % xxxxxxxxxx %". The format of the attachment title 903 is "% Attachment Name %-% Signer Name % (% Signer Email Box %)". In addition, as shown in FIG. 9, after opening the merged file, a mark of a valid certificate may be seen in a toolbar 907.

In order to ensure the guaranteed effectiveness of an electronic signature, the signer is not allowed to return to the previous signing stage or repeat the signing during the signing process. Therefore, in another embodiment, a checker apparatus may be further disposed in the online signing system 100, so that personnel involved in the task may check each other and propose amendment suggestions during the process.

The task creator may designate a "signer whose content needs to be checked" and a "checker responsible for checking". After the designated signer fills a content in the field, the checker checks the content. Before obtaining the consent of the checker, information can be edited back and forth. After all checkers have checked, the signer completes a "send" action to be recorded as signed.

The checker apparatus is suitable for the situation of signing confirmation that needs to be edited back and forth. Taking a business contract as an example, a task is established by a salesperson, and after a customer and the salesperson have both signed, the content is handed over to an operator for confirmation and to be then archived. The operator may check whether the content filled in by the customer and the salesperson is incorrect before signing. If there is any error, the operator may propose amendment suggestions for the salesperson or the customer to revise the content without re-establishing the task or re-filling the entire file.

Specifically, the checker apparatus executes the following steps. A checking request is received from the computing apparatus 120. The signed file is downloaded from the storage database 110 based on the checking request. After receiving a disapproval command, a re-signing command is transmitted to the computing apparatus 120, so that the computing apparatus 120 re-transmits the signing request to the client apparatus 130.

Figure 10:
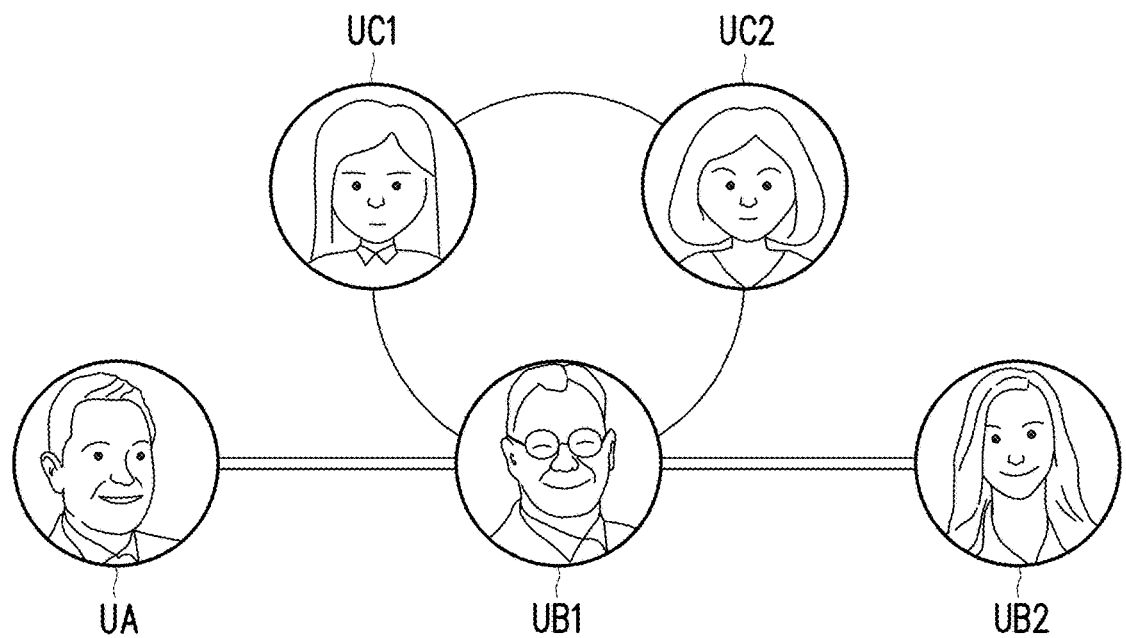
FIG. 10 is a schematic diagram of a checking process according to an embodiment of the disclosure.

FIG. 10 is a schematic diagram of a checking process according to an embodiment of the disclosure. Please refer to FIG. 10. A task creator UA designates a signer UB1 whose content needs to be checked and checkers UC1 and UC2 responsible for checking. Here, the number of checkers responsible for checking may be one or more, which is not limited here. A signer UB2 is the next signer after the signer UB1.

The signed file of the signer UB1 is checked by the checker UC1, and then checked by the checker UC2 after the checking. If the checkers UC1 and UC2 both agree to sign the file, the signing process proceeds to the next signer UB2. If the checker UC1 or the checker UC2 judges that the signed file is incorrect, the computing apparatus 120 re-transmits the signing request to the signer UB1 for re-editing.

The embodiment may also be used for applications such as live signing, instant signing during video conferences, etc. For example, in another embodiment, in the case where a real-time streaming function is enabled, the client apparatus 130 activates a signing interface on the display 133 of the client apparatus 130 after receiving the signing request from the computing apparatus 120, so that the signature field is displayed on the signature interface; and receives the signature object through the signature field, and transmits the signature object to the computing apparatus 120.

In summary, computations of the disclosure are concentrated in the computing apparatus, which can save the computing power of the client apparatus, and also improve the convenience of updating underlying technology in the future (without waiting for the client apparatus to update). Therefore, the architecture may be extended to the client apparatus with weak computing power. In addition, the computing apparatus is used to combine the signature object and the assignment file, so as to prevent differences in the signing merged result caused by differences in software and hardware of the client apparatuses used by multiple signers. In addition, the architecture of setting the computing apparatus in the cloud according to the disclosure can easily expand the computing power through queuing and automatic expansion technologies. In addition, the architecture of setting the storage database in the cloud according to the disclosure can enable the online signing system of the disclosure to accept different cloud services, which greatly increases the flexibility of use. Adding the signing agent in the computing apparatus can capture the designated feature from the signed file to be transmitted to the certificate server to generate the verified object without transmitting the entire signed file to the certificate server, which can save the transmission traffic to improve the transmission speed, and also save fees paid to the certificate server.

What is claimed is:

1. An online signing system, comprising:
a task assignment apparatus, configured to:
  generate an assigned task corresponding to an assignment file and including a file identifier and field information, wherein the assignment file is associated with the file identifier;
  designate signer information comprising a plurality of signers;
  add a signing order to the assigned task in response to the signer information;
a storage database, configured to store the assignment file;

a computing apparatus, configured to receive the assigned task from the task assignment apparatus and generate a signing request corresponding to each of the signers based on the signing order after receiving the assigned task; and a first client apparatus, configured to:
receive the signing request from the computing apparatus;
download the assignment file from the storage database based on the signing request;
receive the field information of the assigned task from the computing apparatus;
display the assignment file on a display of the first client apparatus;
display a signature field at a designated position of the display based on the field information; and
receive an input via an input unit of the first client apparatus to generate a signature object on the signature field, and transmit the signature object to the computing apparatus, wherein the computing apparatus is further configured to:
receive the signature object from the first client apparatus;
download the assignment file from the storage database based on the file identifier;
combine the signature object received from the first client apparatus and the assignment file downloaded from the storage database to obtain a signed file after receiving the signature object; and
transmit the signing request to a second client apparatus of a next signer after obtaining the signed file.

2. The online signing system according to claim 1, wherein the task assignment apparatus is further configured to:
designate the assignment file and the field information, wherein the assignment file is provided by the task assignment apparatus or the storage database;
confirm the file identifier of the assignment file with the storage database after confirming to the computing apparatus for having a permission to use the storage database; and
generate the assigned task based on the file identifier, the signer information, and the field information, and transmit the assigned task to the computing apparatus.

3. The online signing system according to claim 1, wherein the computing apparatus is configured to:
capture a designated feature from the signed file;
transmit the designated feature to a certificate server to obtain a verified object from the certificate server; and
add the verified object to the signed file.

4. The online signing system according to claim 1, wherein the computing apparatus is configured to:
calculate a verification value corresponding to each interactive action based on the interactive action between the first client apparatus and the computing apparatus using blockchain technology, and transmit the verification value to a blockchain server.

5. The online signing system according to claim 1, further comprising a checker apparatus configured to:
receive a checking request from the computing apparatus;
download the signed file from the storage database based on the checking request; and
transmit a re-signing command to the computing apparatus after receiving a disapproval command, so that the computing apparatus re-transmits the signing request to the first client apparatus.

6. The online signing system according to claim 1, wherein the first client apparatus is configured to:
receive an attachment request corresponding to the assignment file from the computing apparatus based on the signing request, and display an attachment function on the display;
select an additional image file through the attachment function; and
simultaneously transmit the additional image file to the computing apparatus when transmitting the signature object to the computing apparatus,
wherein the computing apparatus transmits the additional image file associated with the signed file to the storage database after receiving the additional image file.

7. The online signing system according to claim 6, wherein the computing apparatus is configured to:
generate a merged file based on the signed file and the additional image file after receiving the additional image file and obtaining the signed file;
capture a designated feature from the merged file, and transmit the designated feature to a certificate server to obtain a verified object from the certificate server; and
add the verified object to the merged file.

8. The online signing system according to claim 1, wherein the first client apparatus is configured to:
transmit a re-acquisition request to the computing apparatus after judging that the signing request has expired,
wherein the computing apparatus is configured to:
regenerate the signing request after receiving the re-acquisition request;
transmit the regenerated signing request to the first client apparatus; and
transmit a notification to a task assignment apparatus that generates the assigned task.

9. The online signing system according to claim 1, wherein:
after judging that the signing request has expired, the first client apparatus is configured to transmit a re-acquisition request to a task assignment apparatus that generates the assigned task to notify the computing apparatus through the task assignment apparatus to regenerate the signing request to be transmitted to the first client apparatus.

10. The online signing system according to claim 1, wherein the computing apparatus is configured to:
generate the signing request based on a token format, so that the first client apparatus opens the signing request without logging in,
wherein the signing request comprises: a task identifier, representing an assigned task; the file identifier, representing the assigned file allocated in the assigned task; a signer identifier, representing each signer assigned by the assigned task; an email address, representing an email address corresponding to each signer; and an expiration time, representing a valid time limit of the signing request.

11. The online signing system according to claim 1, wherein the computing apparatus comprises:
a user interface, providing an interface service for the first client apparatus to use, so that the first client apparatus displays the assignment file and a signature field on the display;
a core service, responsible for communicating with the storage database and used to store member data;
an intermediary service, storing the field information designated in the assigned task, responsible for receiving and storing the signature object, and responsible for combining the signature object and the assignment file to obtain the signed file, wherein the field information is used to define a designated position of the signature field on the display; and an auxiliary service, providing a transmission function to transmit the signing request.

12. The online signing system according to claim 1, wherein the first client apparatus is further configured to:

in a case where a real-time streaming function is enabled, activate a signing interface on the display of the first client apparatus after receiving the signing request from the computing apparatus to display a signing field on the signing interface; and receive the signature object through the signature field, and transmit the signature object to the computing apparatus.

13. The online signing system according to claim 1, wherein the first client apparatus is further configured to:

delete the downloaded assignment file from a temporary storage region after generating the signature object.

14. The online signing system according to claim 1, wherein the first client apparatus is further configured to:

notify the computing apparatus to establish a common communication interface after enabling a hand-drawing function, receive a bar code corresponding to the common communication interface from the computing apparatus, and display the bar code on the display, wherein the input unit comprises an image capturing device and a touch screen, and the input unit is configured to:

capture the bar code displayed by the display through the image capturing device, and connect to the common communication interface based on the bar code to display the common communication interface on the touch screen;

receive the input via the touch screen to simultaneously generate the signature object on the common communication interface displayed on the touch screen and a signature field displayed on the display.

15. The online signing system according to claim 1, wherein the computing apparatus is further configured to transmit the signed file to the storage database.

16. An online signing method, used for an online signing system, the online signing system comprising a storage database, a computing apparatus, a first client apparatus, and a task assignment apparatus, the online signing method comprising:

generating, by the task assignment apparatus, an assigned task corresponding to an assignment file and including a file identifier and field information, wherein the assignment file is associated with a file identifier;

transmitting, by the task assignment apparatus, the assigned task to the computing apparatus;

designating, by the task assignment apparatus, signer information comprising a plurality of signers;

adding, by the task assignment apparatus, a signing order to the assigned task in response to the signer information;

receiving, by the computing apparatus, the assigned task;

generating, by the computing apparatus, a signing request corresponding to each of the signers based on the signing order after receiving the assigned task;

transmitting, by the computing apparatus, the signing request to the first client apparatus;

receiving, by the first client apparatus, the signing request from the computing apparatus;

downloading, by the first client apparatus, the assignment file from the storage database based on the signing request after receiving the signing request;

displaying, by the first client apparatus, the assignment file on a display;

displaying, by the first client apparatus, a signature field at a designated position of the display based on the field information;

receiving, by the first client apparatus, an input via an input unit to generate a signature object on the assignment file;

transmitting, by the first client apparatus, the signature object to the computing apparatus;

receiving, by the computing apparatus, the signature object from the first client apparatus;

downloading, by the computing apparatus, the assignment file from the storage database based on the file identifier;

combining, by the computing apparatus, the signature object received from the first client apparatus and the assignment file downloaded from the storage database to obtain a signed file after receiving the signature object; and transmitting, by the computing apparatus, the signing request to a second client apparatus of a next signer after obtaining the signed file.

17. The online signing method according to claim 16, wherein the step of generating, by the task assignment apparatus, the assigned task comprises:

designating the assignment file and the field information, wherein the assignment file is provided by the task assignment apparatus or the storage database;

confirming the file identifier of the assignment file with the storage database after confirming to the computing apparatus for having a permission to use the storage database; and generating the assigned task based on the file identifier, the signer information, and the field information.

18. The online signing method according to claim 16, wherein after the computing apparatus obtains the signed file, the online signing method further comprises:

capturing, by the computing apparatus, a designated feature from the signed file;

transmitting, by the computing apparatus, the designated feature to a certificate server to obtain a verified object from the certificate server; and adding, by the computing apparatus, the verified object to the signed file.

* * * * *